(12) United States Patent
Farid et al.

(10) Patent No.: US 8,965,106 B1
(45) Date of Patent: Feb. 24, 2015

(54) DETECTING IMAGE INCONSISTENCIES

(75) Inventors: Hany Farid, White River Junction, VT (US); Eric Kee, Hanover, NH (US); James O'Brien, Berkeley, CA (US)

(73) Assignee: Fourandsix Technologies, Inc., San Jose, CA (US)

( * ) Notice: Subject to any disclaimer, the term of this patent is extended or adjusted under 35 U.S.C. 154(b) by 298 days.

(21) Appl. No.: 13/472,804

(22) Filed: May 16, 2012

Related U.S. Application Data

(60) Provisional application No. 61/594,935, filed on Feb. 3, 2012.

(51) Int. Cl.
*G06K 9/00* (2006.01)
(52) U.S. Cl.
USPC .......................................... 382/154; 382/291
(58) Field of Classification Search
None
See application file for complete search history.

(56) References Cited

PUBLICATIONS

Wei Zhang et al, "Detecting Photographic Composites Using Shadows", IEEE publication, ICME 2009, copyright 2009, pp. 1042-1045.*
O'Brien et al, "Exposing Photo Manipulation with Inconsistent Reflections", ACM Transactions on Graphics, vol. 31, No. 1, Article—, Publication date: Jan. 2012, pp. 1-11.*
Farid et al., Image Forensic Analyses that Eludes that Human Visual System, SPIE Symposium on Electronic Imaging, 2010.
Stork et al., Recent developments in computer aided analysis of lighting in realist fine art, Image Processing for Artist Identification, Museum of Modern Art, May 27, 2010.

* cited by examiner

*Primary Examiner* — Brian P Werner
(74) *Attorney, Agent, or Firm* — Van Pelt, Yi & James LLP

(57) ABSTRACT

Detecting a consistency of image components is disclosed. A first constraint associated with a possible convergence area of a first component of an image is received. A second constraint associated with a possible convergence area of a second component of the image is received. The first constraint and the second constraint are used to provide a result associated with whether the first component and the second component are consistent.

28 Claims, 11 Drawing Sheets

DETECTING IMAGE INCONSISTENCIES

CROSS REFERENCE TO OTHER APPLICATIONS

This application claims priority to U.S. Provisional Patent Application No. 61/594,935 entitled DETECTING IMAGE INCONSISTENCIES filed Feb. 3, 2012 which is incorporated herein by reference for all purposes.

BACKGROUND OF THE INVENTION

Recent advances in computational photography, computer vision, and computer graphics has allowed for the creation of visually compelling digitally altered "fake" photographs. The resulting undermining of trust in photographs impacts law enforcement, national security, the media, advertising, e-commerce, and more. The field of photo forensics has emerged to assist in identifying tamper and manipulation of images. A technique utilized in photo forensics operates on the assumption that most forms of tampering will disturb some statistical or geometric property of an image. To the extent that these manipulations can be quantified and detected, they may be used to objectively invalidate an image as altered.

BRIEF DESCRIPTION OF THE DRAWINGS

Various embodiments of the invention are disclosed in the following detailed description and the accompanying drawings.

DETAILED DESCRIPTION

Figure 1:
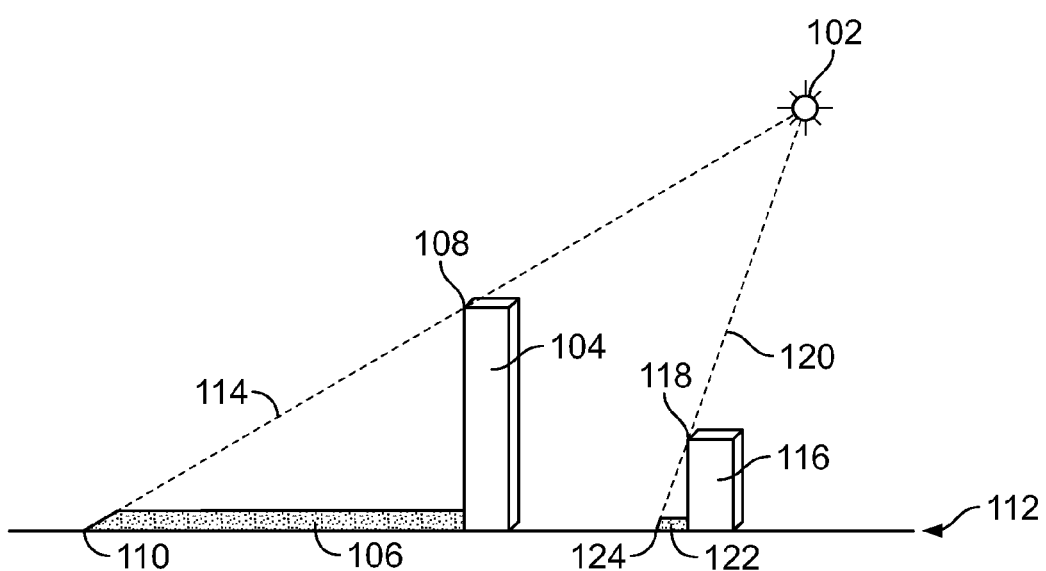
FIG. 1 is a diagram illustrating an example of an image with shadows cast by objects using tracing lines.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Detecting whether an image is consistent is disclosed. In some embodiments, components of an image (e.g., a photograph, a painting, a drawing or a computer rendered image) are analyzed to determine whether the components of the image are consistent. For example shadows contained in the image are analyzed to determine whether the shadows are consistent with a consistent light source. Other examples of image components that may be analyzed include perspective lines in the image that should be consistent with a vanishing point and a reflection in the image that should be consistent with a reflection vanishing point. In some embodiments, by analyzing whether the components of the image are consistent, a user may be able to determine whether a photograph has been altered since the photograph was captured.

In some embodiments, analyzing the components of the image for consistency includes identifying two-dimensional areas where a convergence point may be included for each of the analyzed image components. For example, a convergence point, such as a lighting source, must be consistent in an unaltered photograph. If an image has a single light source, all shadows included in the image must be consistent with the single light source. For one or more analyzed shadows of the image, a two dimensional area where the single light source may exist to cast the shadow is identified. The areas of possible light source locations for different shadows must at least partially overlap in a single area where the single light source must exist. If areas of possible light sources for different shadows do not overlap, the image has been likely altered and at least one of the shadows or an object associated with shadow has been likely altered in the image. These techniques may be used even in the absence of any digital watermark or signature or any other assumed information embedded or extracted from a photograph at the time of recording.

In some embodiments, techniques described in this specification are used for images with a single dominant light source such as outdoor scenes lit by the sun or indoor scenes photographed with a flash. The light source does not have to be within the image. In some embodiments, techniques described in this specification are used for images with linear perspective projection. If an image has been distorted due to lens distortion, the lens distortion may be estimated and removed using a number of standard techniques. In some embodiments, analyzing the components of the image for consistency includes determining whether the image includes an object that was not captured (e.g., photograph), drawn (e.g., a painting), or rendered (e.g., computer generated image) when the image was generated. In some embodiments, the components of the image are analyzed for consistency to allow insertion or removal of image components in a manner that is consistent with the other image components.

FIG. 1 is a diagram illustrating an example of an image with shadows cast by objects using tracing lines. Object 104 and object 116 are on ground 112. Light source 102 emits light and causes shadow 106 and shadow 122 to be cast on ground 112 by object 104 and object 116, respectively. For example, shadow 106 is an area of ground 112 where direct light from light source 102 cannot reach ground 112 due to obstruction by object 104. A specific point on a shadow corresponds to a specific point on the object casting the shadow. A light source (e.g., a center of a light bulb) location may be traced by using a shadow tracing line that crosses both a point on a shadow and a corresponding point on the associated object. By using at least two of these tracing lines, a single dominant light source may be located at a point where the lines cross. As shown in FIG. 1, point 110 on shadow 106 corresponds to point 108 on object 104. Line 114 is traced between point 110 and point 108. Similarly, line 120 is traced between point 124 on shadow 122 and corresponding point 118 on object 116. Line 114 and line 120 cross at light source 102.

If the location of light source 102 was unknown or located outside the image, the location of the light source could be located using line 114 and line 120. Because any line traced through a point on a shadow and a corresponding point on an associated object must intersect at a single light source point, an alteration of the image containing the shadows can be detected by detecting any line trace that does not intersect another line trace at a single point associated with the light source. For example, if another object was digitally inserted into the image of FIG. 1, the in authenticity of the inserted object may be detected by tracing a line through a point on the inserted object and a corresponding point on a shadow associated with the inserted objected and determining that the new line does not intersect line 114 and line 120 at the single point on light source 102.

Figure 2:
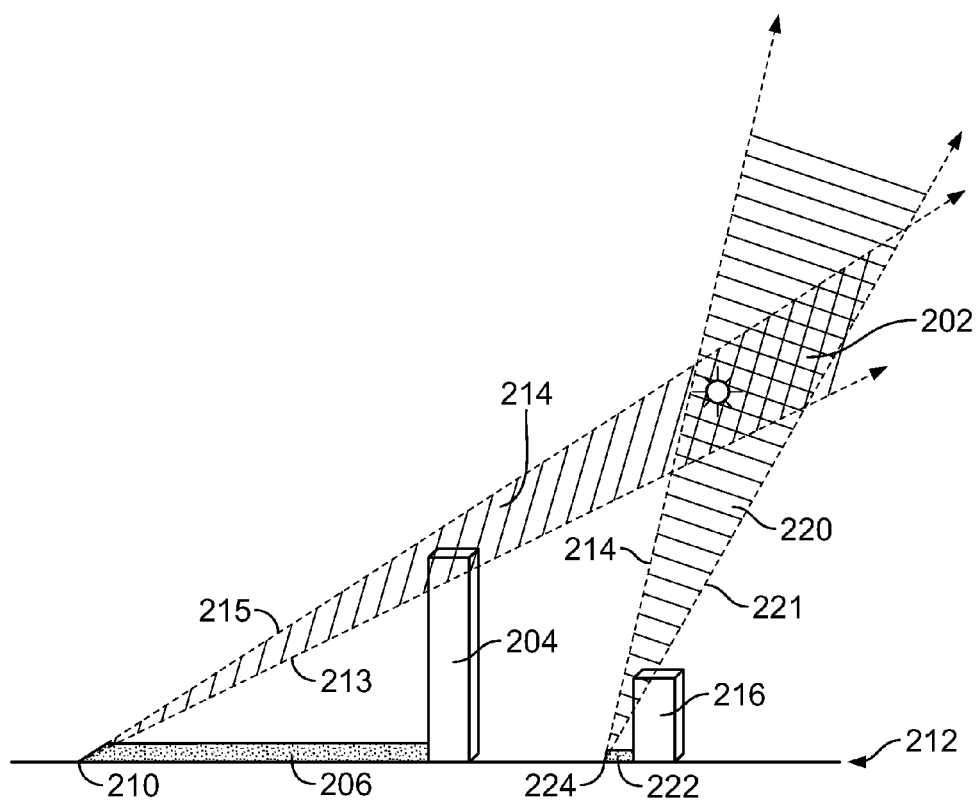
FIG. 2 is a diagram illustrating an example of analyzing an image with shadows cast by objects using wedge areas.

FIG. 2 is a diagram illustrating an example of analyzing an image with shadows cast by objects using wedge areas. Object 204 and object 216 are on ground 212. Light source 202 emits light and causes shadow 206 and shadow 222 to be cast on ground 212 by object 204 and object 216, respectively. Although FIG. 1 explicitly shows a point on a shadow that corresponds to a point on an associated object, it is often difficult to determine the exact location where a point on a shadow corresponds to which exact point on an associated object. An incorrect identification of the point on the associated object, even by a slight offset (e.g., due to the low resolution of the image) could cause the tracing lines to not intersect a light source and become inconsistent with other tracing lines even though a correctly identified point on the object would have resulted in a shadow tracing line that is consistent with the other shadow tracing lines.

In the example shown in FIG. 2, a wedge area including/overlapping a portion of an object that includes a point on the object that corresponds with a point on a shadow is identified rather than merely identifying a line for the given point on the shadow. For example, the exact point on object 204 that is associated with point 210 is unknown or difficult to determine and wedge area 214 that includes/overlaps a portion of object 204 large enough to include the point on object 204 that corresponds with point 210 is identified. Wedge area 214 is bound by line 215 and line 213 that both start at point 210. The location and angle between line 215 and line 213 are determined (e.g., determined automatically, programmatically and/or by a user) to include at least a portion of associated object 204 that includes the point on object 204 that corresponds to point 210. For example, point 210 on the tip of shadow 206 likely corresponds with a point on the top portion of object 204. However, the exact point on object 204 is difficult to determine and wedge area 214 is defined to cover a larger top portion of object 204 that includes the corresponding point on object 204. Similarly, point 224 on the tip of shadow 222 corresponds to a difficult to determine point on a top portion of object 216 and wedge area 220 bound by line 219 and line 221, which is defined in a manner that includes the larger top portion of object 216.

In some embodiments, a user may identify a wedge area by selecting a point on a shadow and identifying the portion of the associated object to be included in the wedge. In some embodiments, the portion of the associated object is automatically determined based on the selection of the point on the shadow. A user may be able to modify the automatically determined portion. In some embodiments, the entire wedge is automatically determined and the user may be able to modify the automatically determined wedge area.

Convergence area 202 of wedge area 214 and wedge area 220 should include the location of a light source. Any additional consistent wedge areas identified in the image must intersect at least a portion of area 202. Any inauthentic alternation of an image may be detected by detecting any wedge area (or trace line or other identified constraint areas as described in the specification) that does not intersect another constraint area in a consistent location with all other wedge areas (or trace line or other constraint areas as described in the specification). For example, if another object was digitally inserted into the image of FIG. 2, the in authenticity of the inserted object may be detected by defining a wedge area from a point on the shadow of the inserted object and including a determined portion of the inserted object that corresponds to the point on the shadow and determining that the newly defined wedge area does not intersect any portion of convergence area 202. In many cases the light source is not located in the image. If a visual location of the convergence area is desired, the canvas or a visual representation of the image may be extended to display the area of the intersection. In some embodiments, the convergence area is determined mathematically.

Figure 3A:
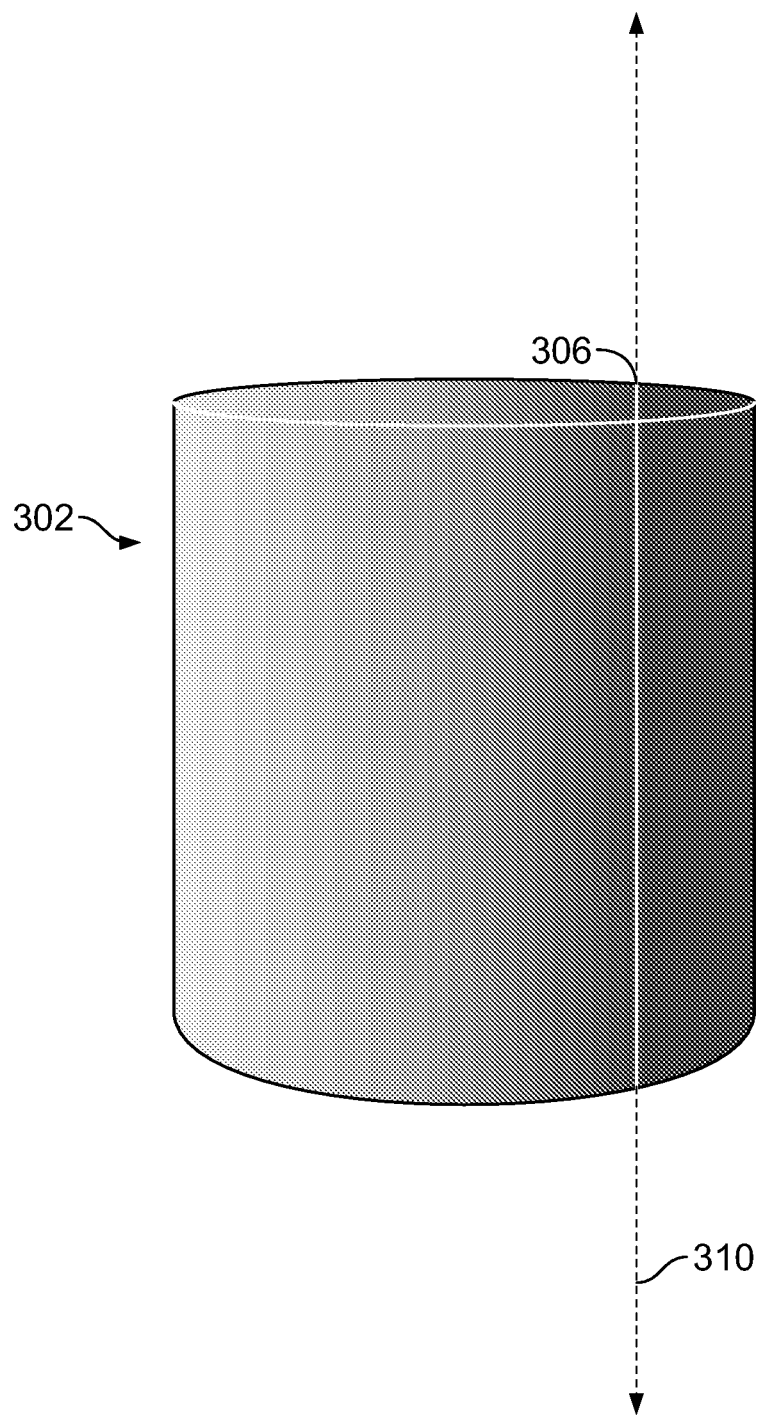
FIG. 3A and FIG. 3B are diagrams illustrating examples of analyzing image components with attached shadows.
Figure 3B:
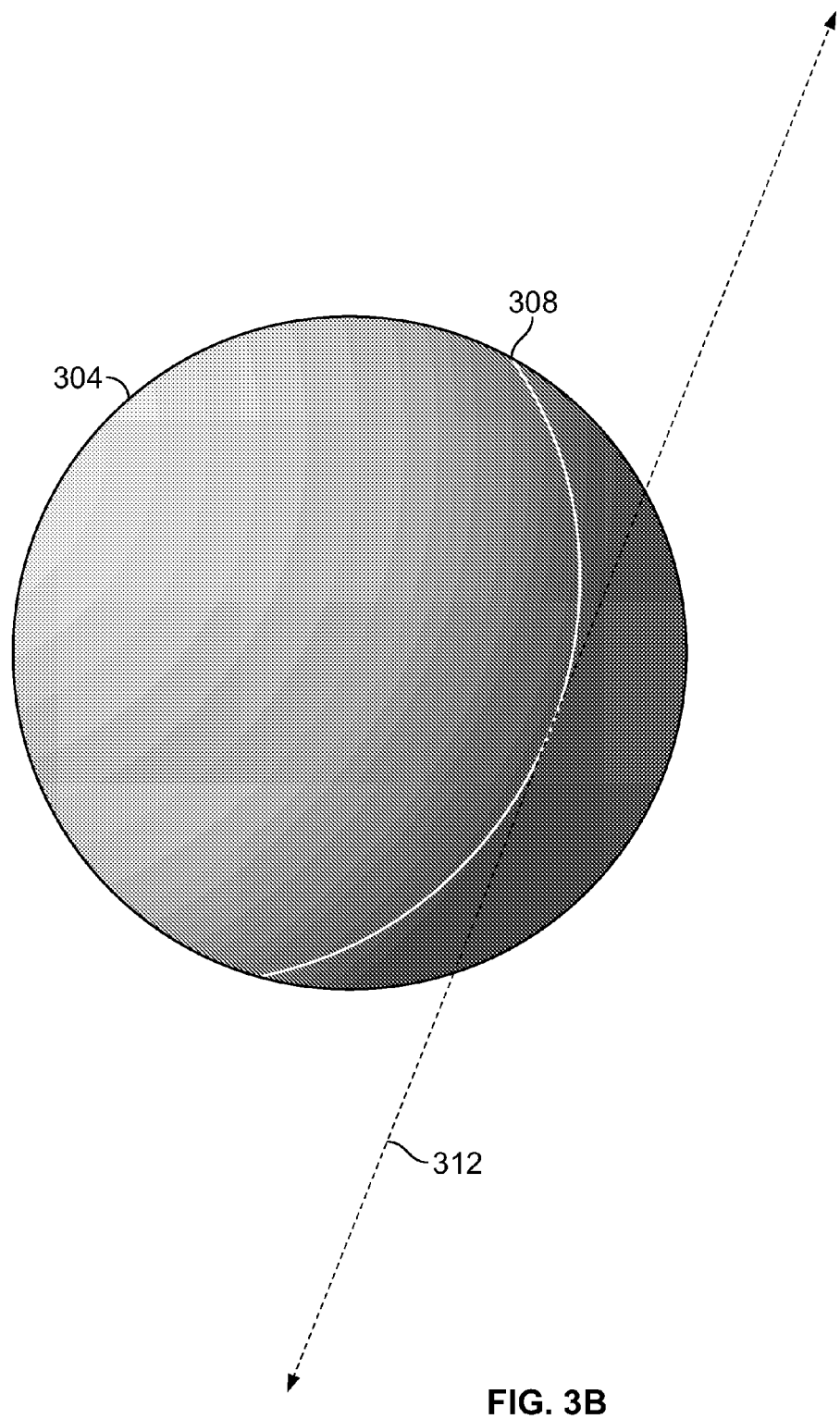

FIG. 3A and FIG. 3B are diagrams illustrating examples of analyzing image components with attached shadows. Attached shadows occur when objects occlude the light from themselves, leaving a portion of the object in shadow. For example, as shown in FIGS. 3A and 3B, cylinder 302 and sphere 304 are illuminated by a distant point light source positioned to the left. Irradiance by the light source at any point on the surface is proportional to the angle between the surface normal and the light direction. Points are in shadow if the surface normal is greater than 90 degrees relative to the light. The terminator is defined to be the surface contour whose normals are 90 degrees relative to the light source, as depicted by line 306 for cylinder 302 and curve 308 for sphere 304.

Similar to the example shown in FIG. 2, in some embodiments, the attached shadow indicates a location of a light source and this indication must be consistent with other light source indications of other shadows in an image. This information may be used to determine the consistency of components of an image. Rather than use a wedge area as shown in FIG. 2 to indicate locations where a light source may exist, half planes (e.g., a wedge area with 180 degree angle) are used for attached shadows because the light's elevation can be ambiguous within 180 degrees. In other words, a line that passes through a selected point on the attached shadow and divides the entire image containing the attached shadow is specified. For example, line 310 is on a point of the attached shadow (e.g., located on the terminator) of cylinder 302 and divides an image that includes cylinder 302. Similarly, line 312 is on a point of the attached shadow (e.g., located on the terminator) of sphere 304 and divides an image that includes sphere 304. In the two resulting areas of the image, one side is specified as the area associated with the light source and the other side includes a portion of the object with at least a portion of the attached shadow. For example, area to the left of line 310 is identified as the area associated with the light source. Likewise, area to the left of line 312 is identified as the area associated with the light source.

In some embodiments, a user may identify a half plane area by selecting a point on an attached shadow and identifying a line (e.g., on a shadow terminator) that passes through the point and divides an image into an indicated area where a light source may exist and another area where the light source may not exist. For example, an arrow normal to the line and pointing to the direction of the light source side may be specified. In some embodiments, the line and area associated with the light source is automatically determined based on a selected point on the attached shadow. A user may be able to modify the automatically determined portion. In some embodiments, the entire half plane area is automatically determined and the user may be able to modify the automatically determined half plane area.

In some embodiments, in an image that has not been inconsistently altered, the convergence area associated with the light source should be consistent with other areas identified as potential areas where a light source may be located. For example, at least a portion of an overlapping area (e.g., convergence area 202 of FIG. 2) of two wedge areas identified in an image as locations where a light source may exist must at least in part overlap with a half plane area identified for a point on an attached shadow. If at least one of the identified areas does not overlap all of the other identified areas, it may be concluded that the image includes a component that is not consistent (e.g., inconsistently altered from an original image).

Figure 4:
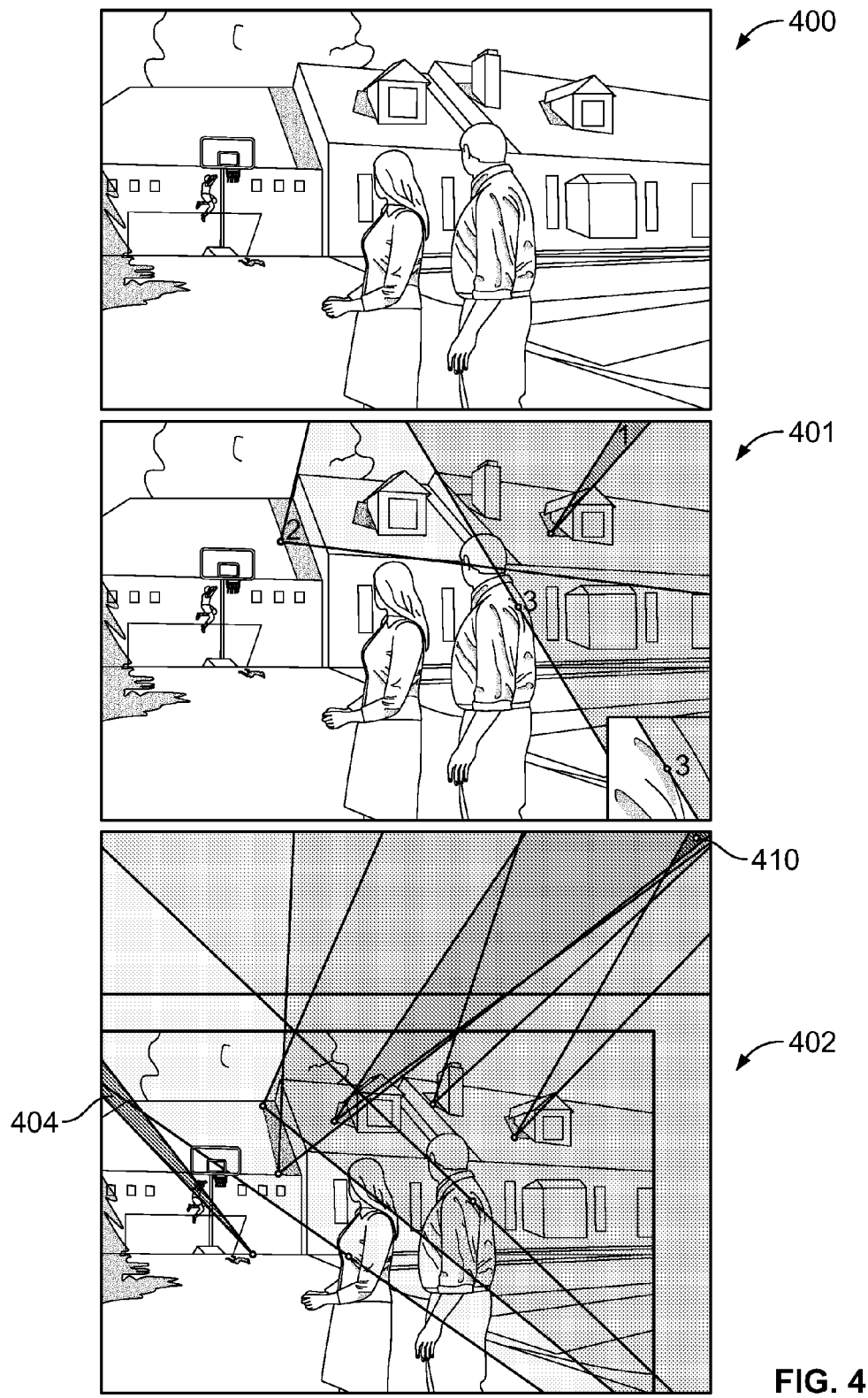
FIG. 4 is a series of diagrams illustrating an example of analyzing components of an image for consistency.

FIG. 4 is a series of diagrams illustrating an example of analyzing components of an image for consistency. Image 400 is the base image to be analyzed for consistency. Image 401 is image 400 with three components that have been analyzed for consistency as shown. Because the exact point on the dormer that is associated with the selected point on the cast shadow of the dormer is difficult to determine, the location and size of the wedge area 1 has been selected to include a portion of the dormer that includes the point on the dormer corresponding to the selected point on the cast shadow. Similarly, wedge area 2 corresponds to a point on a cast shadow on the garage roof. The point on this cast shadow corresponds with a point on the side edge of the roof of the house. Wedge area 2 has been specified to include this side edge. The angle of wedge area 2 is large than the angle of wedge area 1 because the location on the side roof edge corresponding to the shadow point of wedge area 2 is more ambiguous (e.g., larger area) than the location on the dormer corresponding to the shadow point of wedge area 1. Half plane area 3 corresponds to a point on an attached shadow created due to folds on a shirt. The point on the attached shadow has been reproduced and magnified in the lower right corner of the image. The division line between half plane area 3 and the rest of image 400 is a line that passes through the point of interest on the attached shadow and selected in a manner such that half plane area 3 is associated with a possible location of a light source. These three areas must be consistent with each other (e.g., at least in part overlaps at a common location on an infinitely large canvas) if image 400 has not been inconsistently altered.

Image 402 is image 400 with a plurality of image components analyzed for consistency. All of the analyzed components are consistent with convergence area 410 (i.e., overlaps at this common location) except wedge area 404. The canvas of image 402 has been enlarged to visually show convergence area 410. Wedge area 404 corresponds to a point on a cast shadow on the ground of a child playing basketball. This point corresponds with the head of the child and wedge 404 includes points on the head of the child. Because wedge area 404 is not consistent with other determined areas that overlap at area 410, it may be determined that objects/components (e.g., child's associated shadow) associated with wedge area 404 have been altered and/or image 404 has been altered. This may be visually indicated to a user by indicating wedge area 404 and/or visually showing area 410 that does not overlap with area 404.

Figure 5:
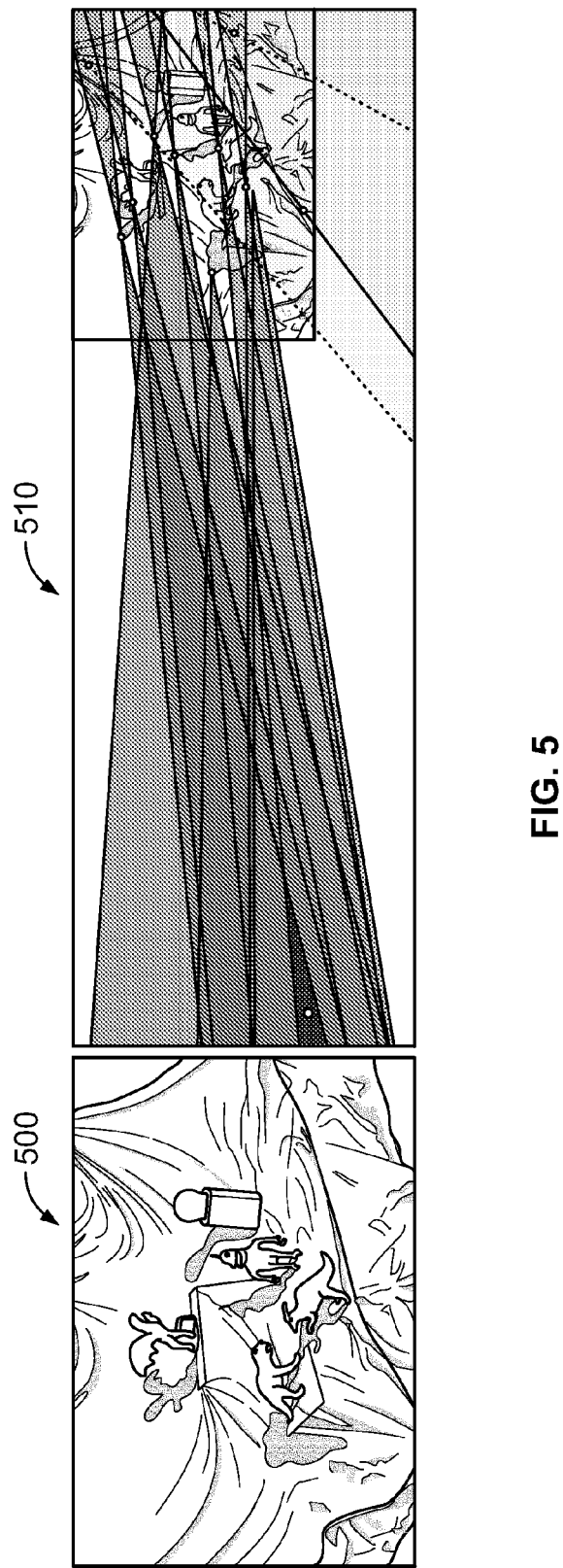
FIG. 5 is an example of analyzing an image with a light source that is behind the center of projection.

FIG. 5 is an example of analyzing an image with a light source that is behind the center of projection. Image 500 is illuminated by a light source that is behind the center of projection (e.g., behind the camera taking the image). Even though image 500 has not been altered, analyzing the image using the previous techniques will result in a determination that the components of the image are inconsistent. This is due to the location of the light source being behind the center of the projection. However image 500 may be analyzed using the same techniques as previously described by flipping/rotating the determined areas by 180 degrees to check for consistency. For example, a point on a cast shadow of a dinosaur included in image 500 is identified. Using this point as the starting point, a wedge area is identified that includes a portion of the dinosaur associated with the point on the cast shadow. However, because the light source is behind the center of projection, the wedge area is rotated 180 degrees around the point on the cast shadow. All other areas identified using shadows in image 500 are also rotated in a similar manner. Image 510 shows image 500 after such analysis where a convergence area has been identified in an extended canvas to the left of the image.

Figure 6:
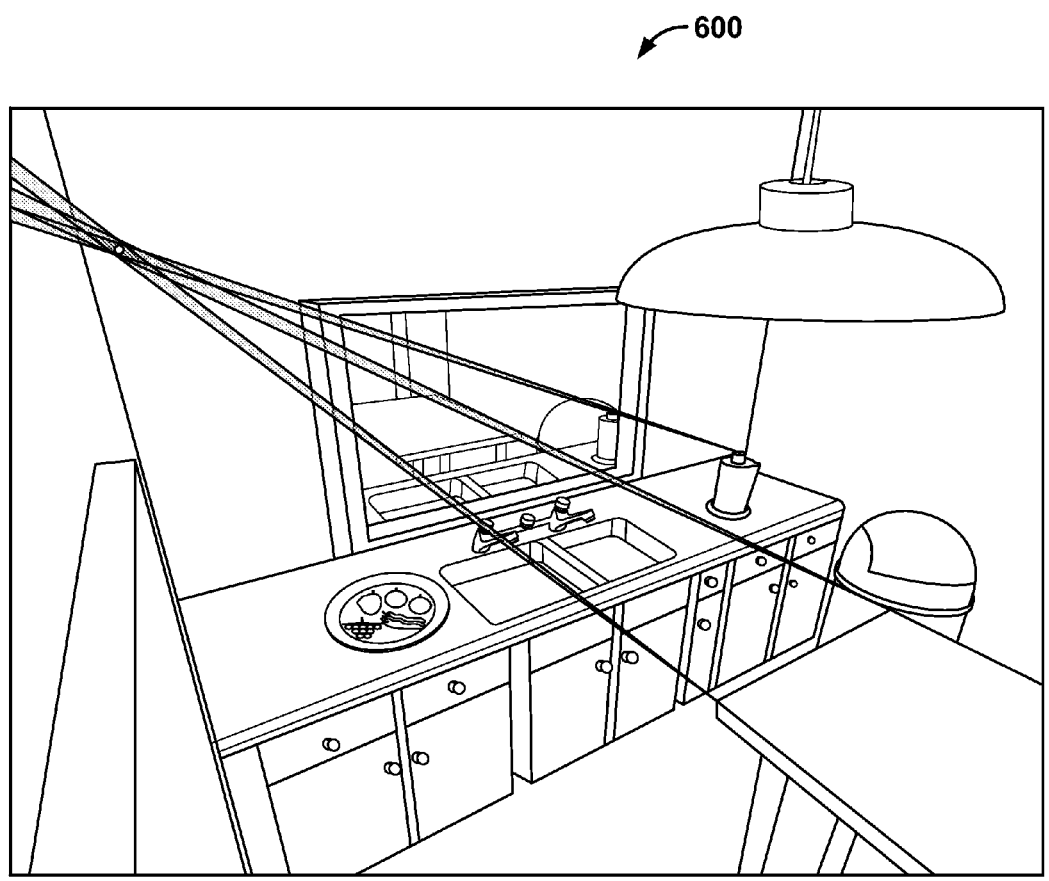
FIG. 6 is an example illustrating analyzing an image with a reflection.

FIG. 6 is an example illustrating analyzing an image with a reflection. The techniques previously described to analyze shadows and light sources may also be used to analyze reflections in an image. A line passing through a point on an object in an image and the corresponding point on a reflection of the object on a planar surface (e.g., a mirror) must pass through a point referred to in the specification as a reflection vanishing point. Any line passing through any point in the same reflection and its corresponding point on the object being reflected must pass through this reflection point. An alteration/inconsistency in an image may be detected by detecting discrepancies in the location of the reflection vanishing point. Because it is difficult to identify the exact point in a reflection that corresponds to the point on the object being reflected, a wedge area (rather than a line) is identified. For an identified point on an object being reflected, a wedge area starting from the point is determined such that the wedge area includes an area of the reflection that likely includes the corresponding point on the reflection. A plurality of wedge areas for various points in the image that is being reflected by the same reflection must all overlap in a single area containing the reflection vanishing point if the image has not been inconsistently altered. Alteration of the image may be detected by identifying a determined wedge area that does not overlap with other determined wedge area(s).

As shown in FIG. 6, image 600 has been analyzed by identifying the consistency of the reflection included in the image. The mirror in image 600 includes a reflection of a table and a towel holder. For a point on a first corner of the table, a wedge area starting from the point and including a portion of the reflection on the mirror that likely includes the corresponding point on the reflection is identified. Similarly, another wedge area for another point on a second corner of the table has been identified. A third wedge area for a point on the towel holder has been identified. All of these wedge areas overlap in an area identified in the top left portion of image 600 and indicate the location of where the reflection vanishing point is located (i.e., convergence area). Because all three wedge areas overlap at a common location, image components associated with these wedge areas are consistent. If another wedge area identified for the reflection shown in image 600 does not overlap at least a portion of the identified reflection vanishing point area shown in FIG. 6, then it may be determined that the image is not consistent and has been inconsistently altered.

Figure 7:
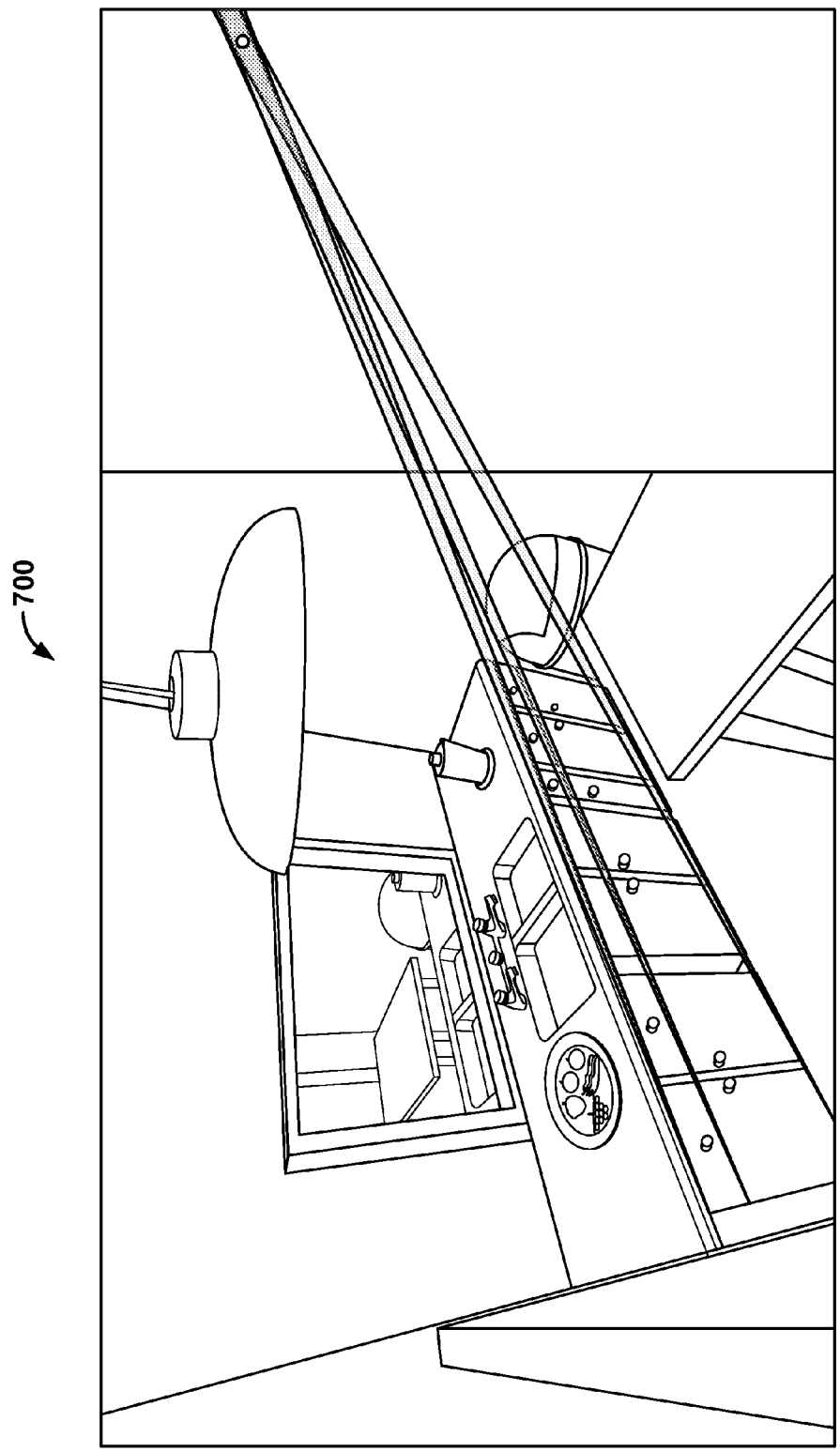
FIG. 7 is an example illustrating analyzing a perspective of an image.

FIG. 7 is an example illustrating analyzing a perspective of an image. The techniques previously described to analyze shadows and light sources may also be used to analyze the linear perspective of an image. If an image follows a linear perspective projection, objects closer to a viewer appear larger than objects further away and traced parallel lines of objects on a planar surface in an image tend to appear to disappear at a linear perspective vanishing point. Lines tracing parallel lines of objects in an image must all pass through a single vanishing pointing in a linear perspective image. An alteration/inconsistency in an image may be detected by detecting discrepancies in the location of the vanishing point. Because it is difficult to trace a line that exactly follows a line of an object that may not be exactly consistent, straight or parallel, a wedge area (rather than a line) is identified. For an identified point on a potential perspective line (e.g. a beginning of the perspective line in the image), a wedge area starting from the point is determined such that the wedge area includes possible points of the object on the perspective line. A plurality of wedge areas for perspective lines for parallel lines must all overlap in a single convergence area containing the vanishing point if the image has not been altered. Alteration of the image may be detected by identifying a determined wedge area that does not overlap with other determined wedge area(s).

As shown in FIG. 7, traceable perspective lines in image 700 have been analyzed. The horizontal lines of the drawers and cabinets shown in the image are substantially parallel. Image 700 shows wedge areas identified for these horizontal lines. All of these wedge areas overlap in an area identified in the top right portion of the extended canvas of image 700 and indicate the location of where the vanishing point is located. Because all three wedge areas overlap at a common convergence area, image components associated with these wedge areas are consistent. If another wedge area identified for the reflection shown in image 700 does not overlap at least a portion of identified convergence area shown in FIG. 7, then it may be determined that the image is not consistent and has been inconsistently altered.

Figure 8:
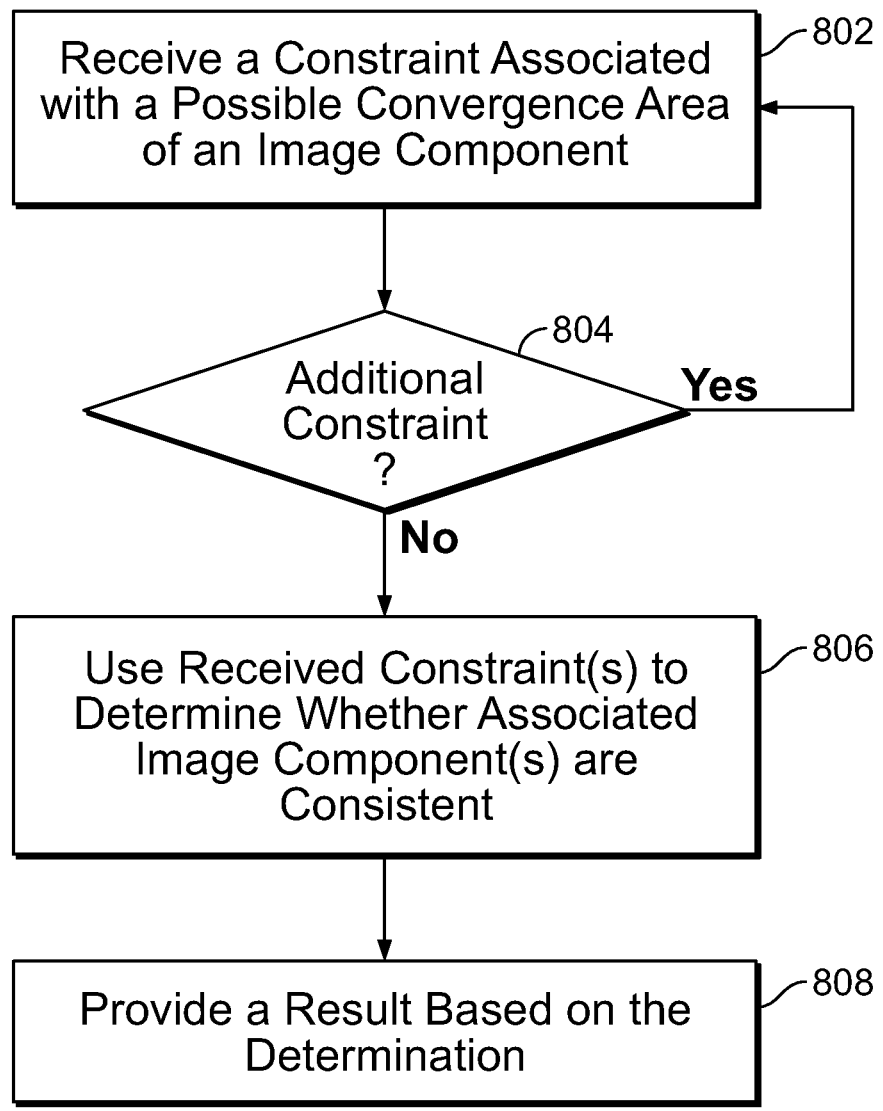
FIG. 8 is a flow chart illustrating an embodiment of a process for determining whether image components are consistent.

FIG. 8 is a flow chart illustrating an embodiment of a process for determining whether image components are consistent. At 802, a constraint associated with a possible convergence area of an image component is received. In various embodiments, the convergence area is associated with a light source, a reflection vanishing point, or a linear perspective vanishing point. Examples of the image component include an object in an image, a reflection in an image, and a shadow in an image. The received constraint may be at least in part specified by a user and/or at least in part automatically determined. For example, a received image is analyzed to determine a plurality of constraints to be used to determine whether the image is a consistent image.

In some embodiments, the received constraint includes a wedge area similar to one or more of the wedge areas discussed previously in the specification. In some embodiments, a user may visually identify a wedge area by selecting a point on an image component and identifying the portion of the associated object to be included in the wedge area. In some embodiments, the portion of the associated object is automatically determined based on the selection of the point. A user may be able to modify the automatically determined portion. In some embodiments, the entire wedge area is automatically determined and the user may be able to modify the automatically determined wedge area.

In some embodiments, the constraint includes a half plane area similar to one or more of the half plane areas discussed previously in the specification. In some embodiments, a user may visually identify a half plane area by selecting a point on an attached shadow and identifying a line (e.g., on a shadow terminator) that passes through the point and divides an image into an indicated area associated with a light source and another area not associated with the light source. For example, an arrow normal to the line and pointing to the direction of the light source side may be specified. In some embodiments, the line and area associated with the light source are automatically determined based on the point on the shadow. A user may be able to modify the automatically determined portion. In some embodiments, the entire half plane area is automatically determined and the user may be able to modify the automatically determined half plane area.

At 804, it is determined whether an additional constraint for the same image exists. If the additional constraint exists, the process returns to 802 where the next constraint is received. If the additional constraint does not exist, the process proceeds to 806. At 806, the received constraint(s) are used to determine whether the associated with the image component(s) are consistent. In some embodiments, determining whether the image components are consistent includes determining whether received constraints are consistent. In some embodiments, determining whether image components are consistent includes determining the location and/or existence of the convergence area and/or displaying/indicating the convergence area.

In some embodiments, determining whether the image component(s) are consistent includes determining whether the received constraints at least in part overlap. For example, the received constraints are visually displayed over the image including the image components and a user is able to determine whether the constraints visually overlap because the areas where the constraints overlap are shaded darker as more constraints overlap the same area. Visually displaying the constraints may include displaying the constraint in an area that extends beyond an area of the image and the size of the extension may be automatically determined or manually specified to enable a determination as to whether the image components are consistent. In some embodiments, an alternative visual representation of a constraint is displayed. For example, as shown in FIG. 5, constraints may overlap in an area that is 180 degrees rotated from a selected point when a light source is behind the center of projection. A visual representation of the constraint is additionally displayed rotated 180 degrees from the selected point. In some embodiments, if a received constraint is not consistent with one or more of the other received constraint(s), the inconsistent constraint is visually indicated (e.g., highlighted in a different color or shading). In some embodiments, determining whether the image components are consistent includes mathematically representing the received constraints and solving the mathematical constraints for the existence of a solution. If a solution exists, then it is determined that the image components are consistent. In some embodiments, a location of the convergence area is determined using the solution.

At 808, a result based on the determination is provided. In some embodiments, the result includes an indication that the received constraints are consistent. In some embodiments, the result includes an indication that the received constraints are not consistent and may include an indication of which constraint(s) are not consistent with which constraint(s). In some embodiments, the result includes a visual indication of which one or more of the constraints overlap in a convergence area and/or a visual indication of which one or more of the constraints do not overlap in a convergence area. In some embodiments, the result includes an indication of how to alter the image containing the image components such that the alteration will be consistent with the received constraints. For example, the process of FIG. 8 is used to determine how to visually alter an image such that it would be difficult to detect that the image was altered. An object may be added to the image and the process of FIG. 8 is used to aid in inserting a shadow associated with the inserted object such that the shadow is consistent with other shadows and the light source of the image.

Figure 9:
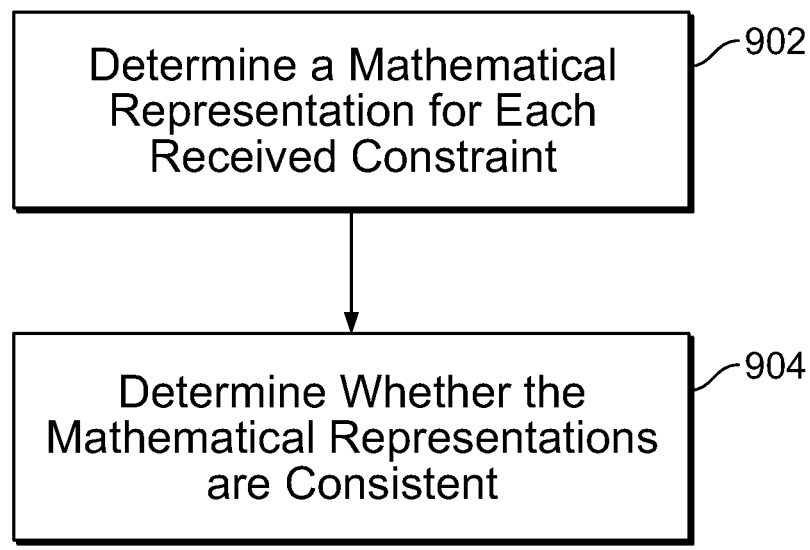
FIG. 9 is a flowchart illustrating an embodiment of a process for analyzing constraints associated with components.

FIG. 9 is a flowchart illustrating an embodiment of a process for analyzing constraints associated with components. In some embodiments, the process of FIG. 9 is included in step 806 of FIG. 8. At 902, a mathematical representation is determined for each received constraint. In some embodiments, the received constraints are constraints received at 802 of FIG. 8. In some embodiments, the received constraint is a constraint that has been visually specified on top of an image of interest. In some embodiments, the constraints are converted into a linear inequality representation. For example a half plane area discussed previously in the specification is specified as a single linear mathematical constraint and a wedge area also previously discussed in the specification is specified as a pair of two linear mathematical constraints. In the example shown in FIG. 10, example 1000 of parameterizing a half plane area and a wedge area are shown. For point $P_b$ in FIG. 10, a single line parameterized by its normal $n_b$ specifies the half plane constraint in the direction of normal $n_b$. In some embodiments, formally, a half-plane constraint is specified with a single linear inequality in the unknown x where $n_i$ is normal to the line and $p_i$ is a point on the line:

$$n_i \cdot x - n_i \cdot p_i \geq 0, \quad (1)$$

Figure 10:
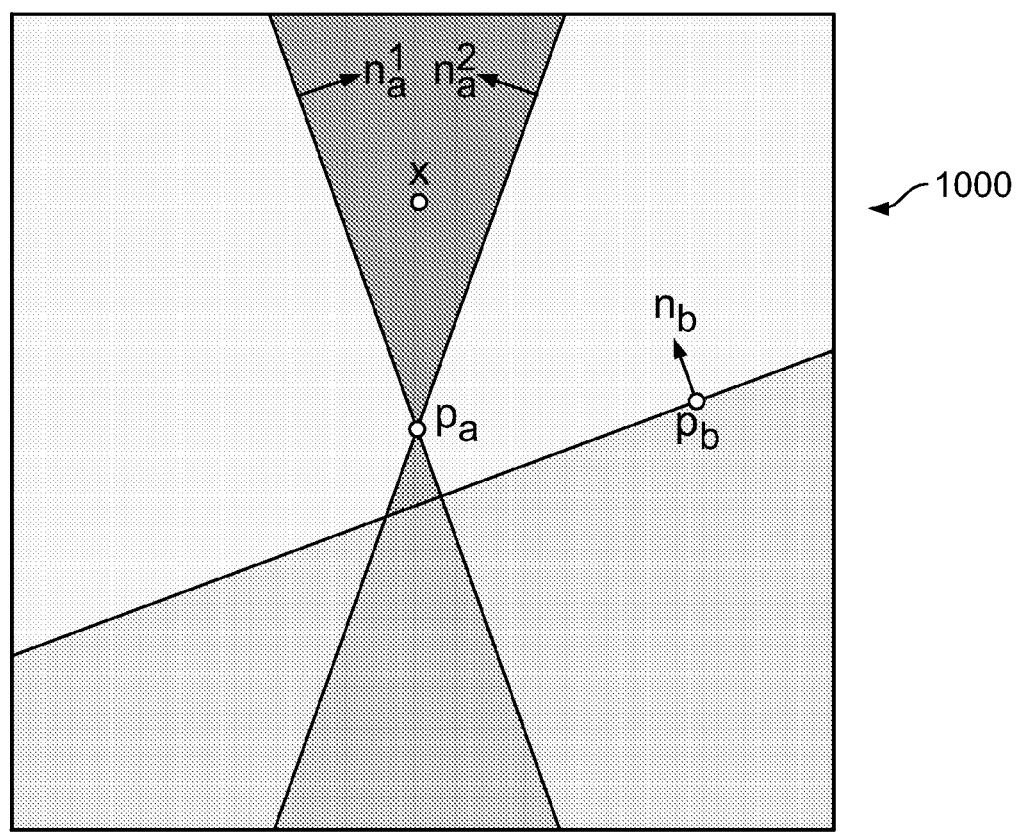
FIG. 10 shows two lines parameterized by their normals $n_a^1$ and $n_a^2$.

FIG. 10 also shows two lines parameterized by their normals $n_a^1$ and $n_a^2$. The direction of the normals specifies the regions of interest. The intersection of these two regions is the upward facing wedge and a wedge area can be specified as the intersection of these two regions. In some embodiments, formally, a wedge constraint is specified with two linear equalities:

$$n_i^1 \cdot x - n_i^1 \cdot p_i \geq 0 \text{ and } n_i^2 \cdot x - n_i^2 \cdot p_i \geq 0. \quad (2)$$

At 904, it is determined whether the mathematical representations of the constraints are consistent. In some embodiments, determining the whether the mathematical representations are consistent includes solving a system of linear inequalities. For example, a collection of half-plane and wedge constraints can be combined into a single system of m inequalities:

$$\begin{pmatrix} n_1 \\ n_2 \\ \vdots \\ n_m \end{pmatrix} \begin{pmatrix} x \\ y \end{pmatrix} - \begin{pmatrix} n_1 \cdot p_1 \\ n_2 \cdot p_2 \\ \vdots \\ n_m \cdot p_m \end{pmatrix} \geq 0 \quad (3)$$

$$Nx - P \geq 0. \quad (4)$$

Given error-free constraints from a consistent scene, a solution to this system of inequalities should exist. Errors or inconsistency may be accounted by introducing a set of m slack variables $s_i$ where $s_i$ is the $i^{th}$ component of the m-vector s:

$$Nx - P \geq -s \quad (5)$$

$$s \geq 0, \quad (6)$$

If the constraints are fully satisfiable then a solution will exist where all slack variables are zero. Solutions with a non-zero slack variable $s_i$ mean that the solution is not consistent with constraint i. The previous inequalities can be combined into a single system as follows where I is an m×m identity matrix:

$$\begin{pmatrix} N & I \\ 0 & I \end{pmatrix} \begin{pmatrix} x \\ s \end{pmatrix} - \begin{pmatrix} P \\ 0 \end{pmatrix} \geq 0, \quad (7)$$

A solution that minimizes the amount of slack required to satisfy this system is determined. As such, subject to the above equation, the linear program consists of minimizing the $L_1$ norm of the vector of slack variables:

$$(0 \quad 1) \begin{pmatrix} x \\ s \end{pmatrix}, \quad (8)$$

In other words, a solution that minimizes the slack variables, while satisfying all of the cast and attached shadow constraints, is determined. If the slack variables for the optimal solution are all zero, then there exists a convergence area that satisfies all of the specified constraints. Otherwise, one or more of the constraints are inconsistent.

As described earlier, a special case exists if a light source is behind the center of projection. In this case, there exists an inherent sign ambiguity in specifying these constraints and its projected location in the image plane is inverted by negating the normals of the constraints. These constraints would take the form:

$$-Nx + P \geq -s. \quad (9)$$

For example as shown in FIG. 10, downward facing region of the wedge area for point $p_a$ corresponds to a sign inversion of the upwards facing wedge region.

In some embodiments, both linear programs (e.g., with constraints Equation (5) and (9)) select the solution with the minimal $L_1$ norm, Equation (8). If either the regular or inverted system has a solution with zero slack, then it is determined that the constraints are mutually consistent. Otherwise, the constraints are inconsistent if it is determined that at least a portion/component of the image has been altered.

In some embodiments, if it is determined that there exists inconsistent violating constraints, it is then desirable to identify which constraints are in conflict with others. This information can be useful to an analyst in determining what parts of an image have been manipulated. In some embodiments, by iteratively solving a system of inequalities for various combinations of received constraints, a determination is made as to which one or more of the constraints is inconsistent or consistent with which one or more of the other constraints. This information may be used to determine which portion and or component of an image has been altered and/or is inconsistent. For example, two constraints are selected at random. If these constraints are not satisfiable, then they form a minimal set of inconsistent constraints. If they are satisfiable, then a randomly selected constraint is added to the set and the linear program is solved. Constraints are added in this way until the system is no longer satisfiable. This entire process is repeated with different random starting conditions. The smallest set of violating constraints, which may or may not be unique, identifies the inconsistent constraints.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of detecting a consistency of image components, comprising:
   receiving a first constraint that defines a possible convergence area of a first component of an image;
   receiving a second constraint that defines a possible convergence area of a second component of the image; and
   using a processor that uses the first constraint and the second constraint to provide a result associated with whether the first component and the second component are consistent with a common source.

2. The method of claim 1, wherein the first component and the second component are consistent if the first constraint and the second constraint at least in part overlap.

3. The method of claim 1, wherein the first component and the second component are not consistent if the first constraint and the second constraint do not at least in part overlap.

4. The method of claim 1, wherein the common source includes a common light source.

5. The method of claim 1, wherein the common source includes a common reflection vanishing point.

6. The method of claim 1, wherein the common source includes a common linear perspective vanishing point.

7. The method of claim 1, wherein the first component is associated with a point on a cast shadow.

8. The method of claim 7, wherein the first constraint is associated with a wedge area.

9. The method of claim 1, wherein the first component is associated with a point on an attached shadow.

10. The method of claim 9, wherein the first constraint is associated with a half plane area.

11. The method of claim 1, wherein the first constraint is at least in part visually specified on top of the image by a user.

12. The method of claim 1, wherein the first constraint is at least in part automatically determined.

13. The method of claim 1, wherein the result includes a visual representation of whether a visual representation of the first constraint and a visual representation of the second constraint at least in part overlap.

14. The method of claim 1, wherein the result includes a visual representation of whether an alternative visual representation of the first constraint and an alternative visual representation of the second constraint at least in part overlap due to a light source of the image being behind a center of projection of the image.

15. The method of claim 1, further comprising determining a first mathematical representation of the first constraint and a second mathematical representation of the second constraint.

16. The method of claim 15, wherein the first mathematical representation includes a linear inequality.

17. The method of claim 15, wherein using the processor to provide the result includes solving the mathematical representations for a solution that indicate whether the first component and the second component are consistent.

18. The method of claim 17, wherein solving the mathematical representations include solving a system of linear inequalities.

19. The method of claim 1, wherein the result includes an indication that the first constraint and the second constraint are included in a set including a minimum number of received constraints associated with inconsistent components of the image.

20. The method of claim 1, wherein the result includes an indication of how to alter a portion of the image such that the portion will be consistent with the first component and the second component.

21. The method of claim 1, wherein the result includes an indication of how to alter the second component such that the first component and the second component will be consistent.

22. A system for detecting a consistency of image components, comprising:
   a processor configured to:
      receive a first constraint that defines a possible convergence area of a first component of an image;
      receive a second constraint that defines a possible convergence area of a second component of the image; and
      use the first constraint and the second constraint to provide a result associated with whether the first component and the second component are consistent with a common source; and
   a memory coupled to the processor and configured to provide the processor with instructions.

23. A computer program product for detecting a consistency of image components, the computer program product being embodied in a tangible non-transitory computer readable storage medium and comprising computer instructions for:
   receiving a first constraint that defines a possible convergence area of a first component of an image;
   receiving a second constraint that defines a possible convergence area of a second component of the image; and
   using the first constraint and the second constraint to provide a result associated with whether the first component and the second component are consistent with a common source.

24. The system of claim 22, wherein the first component and the second component are consistent if the first constraint and the second constraint at least in part overlap.

25. The system of claim 22, wherein the common source includes a common light source.

26. The system of claim 22, wherein the common source includes a common reflection vanishing point.

27. The system of claim 22, wherein the common source includes a common linear perspective vanishing point.

28. The system of claim 22, wherein the result includes a visual representation of whether a visual representation of the first constraint and a visual representation of the second constraint at least in part overlap.

* * * * *